(12) United States Patent
Panje (10) Patent No.: US 11,763,346 B2
(45) Date of Patent: Sep. 19, 2023

(54) MANAGING ADVERTISING CONTENT

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

(*) Notice: Subject to any disclaimer, the term of this patent is extended or adjusted under 35 U.S.C. 154(b) by 156 days.

(21) Appl. No.: 17/349,552

(22) Filed: Jun. 16, 2021

(65) Prior Publication Data

US 2022/0067784 A1 Mar. 3, 2022

Related U.S. Application Data

(60) Provisional application No. 63/072,398, filed on Aug. 31, 2020.

(51) Int. Cl.
| | |
|---|---|
| *G06Q 30/02* | (2023.01) |
| *G06Q 30/0251* | (2023.01) |
| *G06F 16/44* | (2019.01) |
| *G06F 16/41* | (2019.01) |
| *H04L 65/60* | (2022.01) |

(52) U.S. Cl.
CPC ......... *G06Q 30/0257* (2013.01); *G06F 16/41* (2019.01); *G06F 16/44* (2019.01); *H04L 65/60* (2013.01)

(58) Field of Classification Search
CPC ....... G06Q 30/0257; G06Q 30/0207–30/0277; G06F 16/41; G06F 16/44; H04L 65/60; H04N 21/25883; H04N 21/25891; H04N 21/25866; H04N 21/4147; H04N 21/42638; H04N 21/4331; H04N 21/4334; H04N 21/4383; H04N 21/44016; H04N 21/8456; H04N 21/812
See application file for complete search history.

(56) References Cited

U.S. PATENT DOCUMENTS

| | | | |
|---|---|---|---|
| 6,950,623 B2 * | 9/2005 | Brown | H04H 60/06 455/418 |
| 7,266,832 B2 * | 9/2007 | Miller | H04N 21/4532 348/E7.083 |
| 8,387,105 B1 * | 2/2013 | Weiss | H04N 21/44016 725/135 |
| 9,402,113 B1 * | 7/2016 | Shackleton | H04N 21/8146 |
| 11,023,124 B1 * | 6/2021 | Che | G06F 1/1626 |

(Continued)

OTHER PUBLICATIONS

International Search Report and Written Opinion Re: Application No. PCT/US2021/037656 (dated Aug. 25, 2021).

*Primary Examiner* — Thuy N Nguyen
(74) *Attorney, Agent, or Firm* — Chernoff, Vilhauer, McClung & Stenzel, LLP (57) ABSTRACT

Methods and systems of managing advertising content are shown and disclosed. In one embodiment, the method includes outputting first multimedia content from a first channel, and outputting TAD content from a TAD channel instead of the first multimedia content during a TAD window of the first multimedia content. The method additionally includes receiving a first user input requesting multimedia content of a content channel different from the TAD channel during the TAD window, and outputting the multimedia content of the content channel instead of the TAD content in response to the first user input.

4 Claims, 6 Drawing Sheets

(56) References Cited

U.S. PATENT DOCUMENTS

| | | | |
|---|---|---|---|
| 2006/0070095 A1 | 3/2006 | Newton et al. | |
| 2008/0040226 A1* | 2/2008 | Roker | H04L 67/306 |
| | | | 705/14.66 |
| 2008/0152300 A1* | 6/2008 | Knee | G11B 27/036 |
| | | | 386/250 |
| 2010/0043022 A1* | 2/2010 | Kaftan | H04N 21/64784 |
| | | | 725/34 |
| 2013/0086607 A1* | 4/2013 | Tom | H04N 21/8153 |
| | | | 725/32 |
| 2014/0082659 A1 | 3/2014 | Fife et al. | |
| 2014/0282714 A1* | 9/2014 | Hussain | H04N 21/4383 |
| | | | 725/34 |
| 2014/0359667 A1* | 12/2014 | Kilar | H04N 7/17318 |
| | | | 725/37 |
| 2015/0040176 A1* | 2/2015 | Hybertson | H04N 21/812 |
| | | | 725/131 |
| 2015/0312637 A1* | 10/2015 | Maisenbacher | H04N 21/44008 |
| | | | 725/32 |
| 2016/0105702 A1* | 4/2016 | Pasko | H04N 21/4532 |
| | | | 725/12 |
| 2016/0134397 A1* | 5/2016 | Kobayashi | H04W 24/08 |
| | | | 370/329 |
| 2018/0160195 A1* | 6/2018 | Redmond | G06Q 30/0251 |
| 2018/0160196 A1* | 6/2018 | Wahl | H04N 21/2668 |
| 2018/0268435 A1* | 9/2018 | Lee | G06Q 30/0241 |
| 2019/0320233 A1* | 10/2019 | Zhao | H04N 21/4181 |
| 2020/0068264 A1 | 3/2020 | Augiano | |

\* cited by examiner

MANAGING ADVERTISING CONTENT

CROSS REFERENCE TO RELATED APPLICATIONS

This application claims the benefit of U.S. Provisional Patent Application Ser. No. 63/072,398 filed Aug. 31, 2020.

BACKGROUND

The subject matter of this application relates to providing advertising content in multimedia streams, in particular systems and methods of managing advertising content, such as targeted advertising content, during viewing by customers.

Targeted Advertising (TAD) technology is used by Multiple System Operators (MSOs) and content producers to enhance revenue generation. For example, several MSOs use splicing or tuned transitions to jump from network content to advertisement content and vice-versa. Multiple advertisements are used for a particular advertisement time slot, which are intended or targeted for different customer set top boxes based on the customers' profiles. The multiple advertisements may be in the same channel transport streams and/or may be in different channels. Advertisement client software applications (or TAD applications) generally tune to an advertisement-based user profile or MSO set preference when the time slot or TAD window for the advertisement arrives. If the customer attempts to tune to a different channel during the TAD window, the TAD application may force the customer to stay on the TAD channel and may tune to the customer's request channel only when the TAD window has passed or has ended.

However, when tuning to the TAD channel is performed, such as via the customer's gateway and/or set top box, to provide the advertisements or TAD content during the TAD window, tuning back to the network channel needs to occur at the end of the TAD window. Having to tune back causes acquisition or reacquisition delays and tuning artifacts, which results in a suboptimal tune back experience for the customer. Such delays also may lead to the customer missing a beginning portion of the same network channel or a different network channel if the customer requested a new channel during the TAD window. What is desired, therefore, are systems and/or methods of managing advertising content, such as targeted advertising, such that tuning between network channels and TAD channels is seamless without any tuning artifacts or tuning delays.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
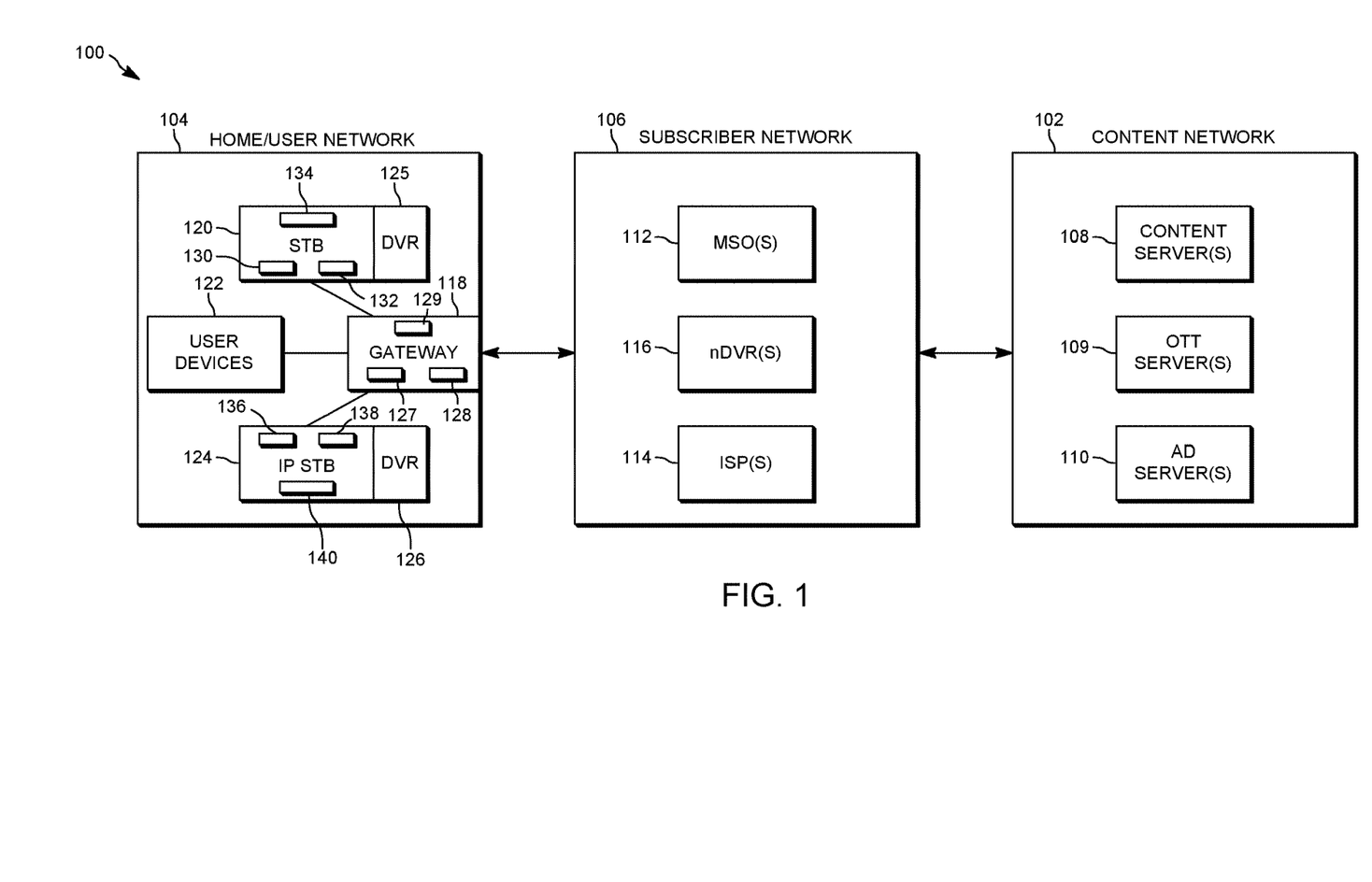
FIG. 1 is a high-level block diagram of an example of a network for managing advertising content.

Referring to FIG. 1, an example network environment 100 for providing content from a content network 102 to a home or user network 104 via a provider, access, or subscriber network 106, and for managing advertising content viewed by customers in the home or user network. Content includes any type of video or audio media, such as movies, television shows, music, radio, advertisements, etc.

Content network 102 includes one or more content servers 108, one or more over-the-top servers 109, and one or more advertisement servers 110. The content, over-the-top, and advertisement servers store content that is provided to home network 104. Content server(s) 108 provide content via a multiple system operator (MSO) and/or an internet service provider. Over-the-top servers (OTT) 109 provide content only via over the top streaming for at least one client device of the home network. Advertising server(s) 110 provide advertising content, such as targeted advertising content.

Subscriber network 106 includes one or more Multiple System Operator (MSO) systems 112, which includes multiple cable TV systems and/or direct satellite TV systems. For example, MSO system 112 may include one or more headends, regional headends, a network architecture of fiber optic, twisted pair, and/or co-axial lines, and/or amplifiers. Subscriber network 112 also includes one or more Internet Service Providers (ISP) 114. Each ISP 114 includes a Point of Presence (POP) that connect to Network Access Points (NAP), such as via routers and a T3 backbone. In the example shown in FIG. 1, subscriber network 106 includes one or more network Digital Video Recorders (nDVRs) 116, which may be part of and/or separate from MSO systems 112. Various content from content network 102 may be recorded and/or stored on nDVRs 116 based on requests made by users or subscribers. Subscriber network 106 may include other components not explicitly shown in FIG. 1, such as transcoders, streamers, just-in-time (JIT) packagers, etc.

Home/user network 104 includes a gateway 118, a set top box 120, user devices 122, and an Internet Protocol (IP) set top box 124. In some embodiments, gateway 118 includes a first tuner 127, a second tuner 128, and memory 129. Set top box 120 is operable to connect to a television to deliver television services through traditional terrestrial, satellite, and cable formats. Set top box 120 may include a digital video recorder (DVR) 125 and/or may have a graphic user interface (GUI) that may be assessed by the user via the television to which set top box 120 is connected. In other embodiments, DVR 125 may be separate from set top box 120 and may include its own first and second tuners. In some embodiments, set top box 120 also may include a plurality of tuners, such as a first tuner 130 and a second tuner 132, and memory 134, such as a live-off-disk (LOD) buffer.

User devices 122 may be any device that may receive content, such as smart phones, mobile phones, tablet computers, smart watches and other wearables, gaming systems, etc. The user devices may have a GUI that may be accessed by the user via the screen on the device. IP set top box 124 is operable to connect to a television over the Internet instead of being delivered through traditional terrestrial, satellite, and cable formats. The IP set top box may include a digital video recorder (DVR) 126 and/or may have a GUI that may be accessed by the user via the television to which the IP set top box is connected. In other embodiments, DVR 126 may be separate from IP set top box 124 and may include its own first and second decoders. In some embodiments, IP set top box 124 may include a plurality of decoders, such as a first decoder 136 and a second decoder 138, and memory 140, such as live-off-disk (LOD) buffer.

Figure 2:
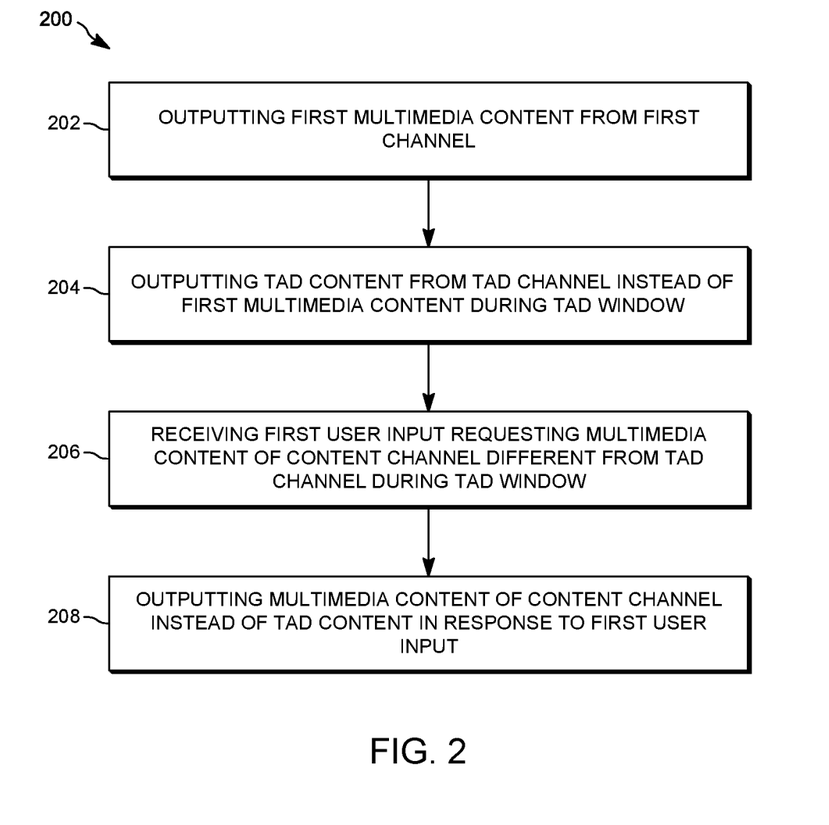
FIG. 2 is a flowchart illustrating an example of a process of managing advertising content.

Referring to FIG. 2, a flowchart is shown of an example method or process 200 of managing advertising content, which may be performed, for example, by MSO system 112, gateway 118, set top box 120, IP set top box 124, and/or DVRs 125, 126, and/or one or more their components, such as first tuner 127, second tuner 128, first tuner 130, second tuner 132, first decoder 136, and/or second decoder 138. At 202, first multimedia content is outputted from a first channel, such as through set top box 120 or IP set top box 124. Tuning to the first channel may be performed, such as via tuner 130 or 132 or via decoder 136 or 138, prior to or as part of step 202 if not already tuned to that channel.

At 204, targeted advertising (TAD) content is outputted from a targeted advertising (TAD) channel instead of the first multimedia content during a targeted advertising (TAD) window of the first multimedia content. Tuning to the TAD channel may be performed, such as via tuner 127, 128, 130, or 132 or via decoder 136 or 138, prior to or as part of step 204. The tuning may be performed by the same tuner/decoder as used in step 202 or may be performed by a different tuner/decoder. In some embodiments, tuning to the first channel is maintained by one of the tuners/decoders while a different tuner/decoder tunes to the TAD channel. For example, if a first tuner/decoder is used to tune to the first channel and that same tuner/decoder is used to tune to the TAD channel, then a second tuner/decoder may be used to tune to the first channel. In some embodiments, the tuning to the first channel by the second tuner/decoder may occur automatically in response to the first tuner/decoder (which was previously used to tune to the first channel) tuning to the TAD channel without any user input requesting tuning to the first channel during the TAD window.

At 206, user input is received requesting multimedia content of a content channel different from the TAD channel during the TAD window. The user input may be received via the graphical user interface of set top box 120, IP set top box 124, DVR 125, and/or DVR 126. For example, the graphical user interface may include a "swap" button that allows a user to switch between multimedia content of a content channel (such as the first channel) and TAD content of the TAD channel. The user clicking or pressing on the swap button would be received as user input requesting, for example, the multimedia content of the previous channel, such as the first channel. In some embodiments, the graphical user interface may receive a channel request from the user for the multimedia content of the first channel, or the multimedia content of a second channel different from the first channel, during the TAD window.

At 208, multimedia content of the requested content channel is outputted instead of the TAD content in response to the user input. For example, the multimedia content of the first channel may be outputted in response to user input requesting that channel. Alternatively, the multimedia content of a second channel different from the first channel may be outputted in response to the user input requesting that channel. In some embodiments, the outputting may occur during the TAD window and, in other embodiments, the outputting may occur after or at the end of the TAD window. If not already tuned to the requested channel, tuning to the requested channel may be performed, such as via tuner 127, 128, 130, or 132 or via decoder 136 or 138, prior to or as part of step 208. The tuning may be performed by the same tuner/decoder as used in step 202 and/or step 204 or may be performed by a different tuner/decoder. For example, tuning for steps 202 and 208 may be performed by a first tuner/decoder, and tuning may be performed for step 204 by a second tuner/decoder separate from the first tuner/decoder. In another example, tuning for steps 202 and 204 may be performed by a first tuner/decoder, and tuning may be performed for step 208 by a second tuner/decoder.

Method 200 may, in some embodiments, include, storing multimedia content of one or more content channels other than the TAD channel, such as multimedia content from the first and/or second channels. The content may be stored in memory, for example, on one or more live-off-disk (LOD) buffers. The storing may be in response to user input requesting the content channel(s). When multimedia content from the content channel(s) is stored, the outputting at step 208 may including outputting the stored multimedia content from any portion of that stored content, such as the beginning or start of the stored multimedia content, live or from a portion of the stored multimedia content that chronologically corresponds to the end of the TAD window, etc. Although FIG. 2 shows particular steps for a process of managing advertising content, other examples of the process may add, omit, replace, repeat, and/or modify one or more steps.

Figure 3:
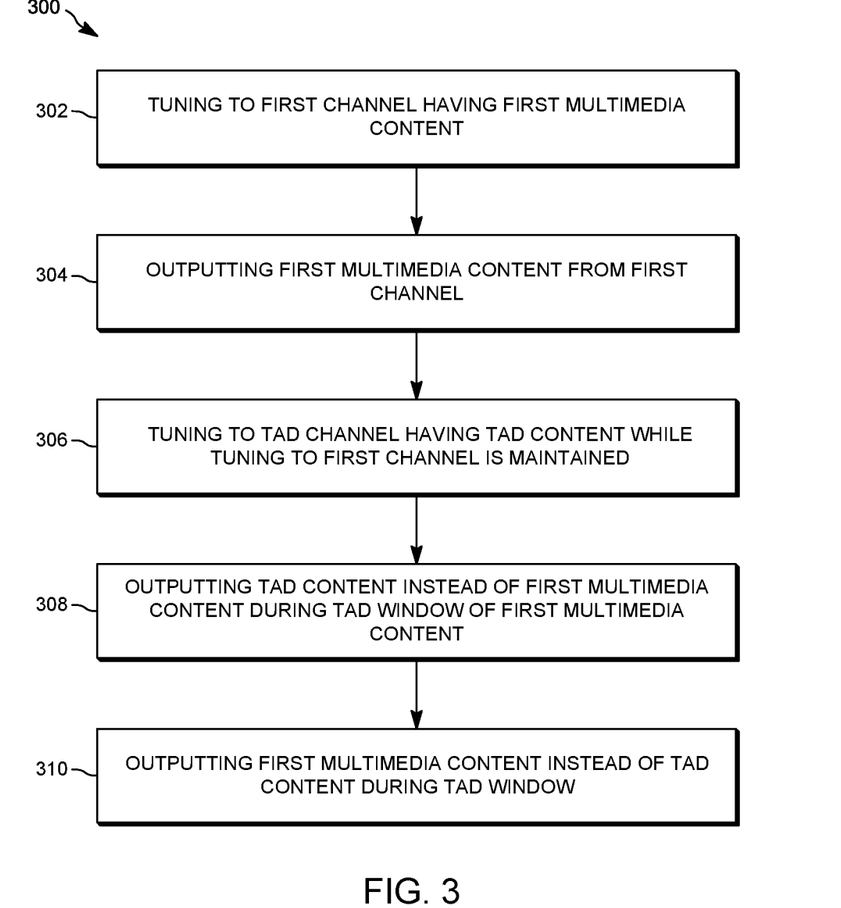
FIG. 3 is a flowchart illustrating another example of a process of managing advertising content.

Referring to FIG. 3, a flowchart is shown of an example method or process 300 of managing advertising content, which may be performed, for example, by MSO system 112, gateway 118, set top box 120, IP set top box 124, and/or DVRs 125, 126, and/or one or more their components, such as first tuner 127, second tuner 128, first tuner 130, second tuner 132, first decoder 136, and/or second decoder 138. At 302, tuning to a first channel having first multimedia content is performed, such as via a tuner 130 or decoder 136. At 304, the first multimedia content from the first channel is outputted, such as through set top box 120 or IP set top box 124.

At 306, tuning to a TAD channel having TAD content is performed, such as via a tuner or a decoder. While tuned to the TAD channel, tuning to the first channel may be maintained. For example, tuning to a TAD channel may be performed via a second tuner or a second decoder with the tuning to the first channel maintained by a first tuner or a first decoder 136. Alternatively, tuning to a TAD channel may be performed via a first tuner or a first decoder with tuning to the first channel performed or maintained by a second tuner or a second decoder.

At 308, the TAD content of the TAD channel is outputted instead of the first multimedia content of the first channel, such as via set top box 120 or IP set top box 124. The outputting at step 308 is made during a TAD window of the first multimedia content. At 310, the first multimedia content of the first channel is outputted instead of the TAD content of the TAD channel during the TAD window, such as via set top box 120 or IP set top box 124. The outputting at 310 may occur, for example, in response to receiving user input requesting the first multimedia content of the first channel during the TAD window, such as via the graphical user interface of set top box 120 or IP set top box 124. Alternatively, the outputting at 310 may occur in response to advertising logic in set top box 120 or IP set top box 124, which may occur automatically without receiving any user input requesting the first multimedia content of the first channel during the TAD window.

Method 300 may, in some embodiments, include storing multimedia content of one or more content channels other than the TAD channel, such as multimedia content from the first and/or second channels. The content may be stored in memory, for example, on one or more live-off-disk (LOD) buffers. The storing may be in response to user input requesting the content channel(s). When multimedia content from the content channel(s) is stored, the outputting at step 310 may include outputting the stored multimedia content from any portion of that stored content, such as the beginning or start of the stored multimedia content, live or from a portion of the stored multimedia content that chronologically corresponds to the end of the TAD window, etc.

Additionally, method 300 may, in some embodiments, include receiving additional user input to switch between the first multimedia content of the first channel and the TAD content of the TAD channel. For example, user input may be received requesting the TAD content of the TAD channel instead of the first multimedia content of the first channel outputted at 310 during the TAD window. In response, the TAD content of the TAD channel may again be outputted in response to receiving the user input. Although FIG. 3 shows particular steps for a process of managing advertising content, other examples of the process may add, omit, replace, repeat, and/or modify one or more steps.

Figure 4:
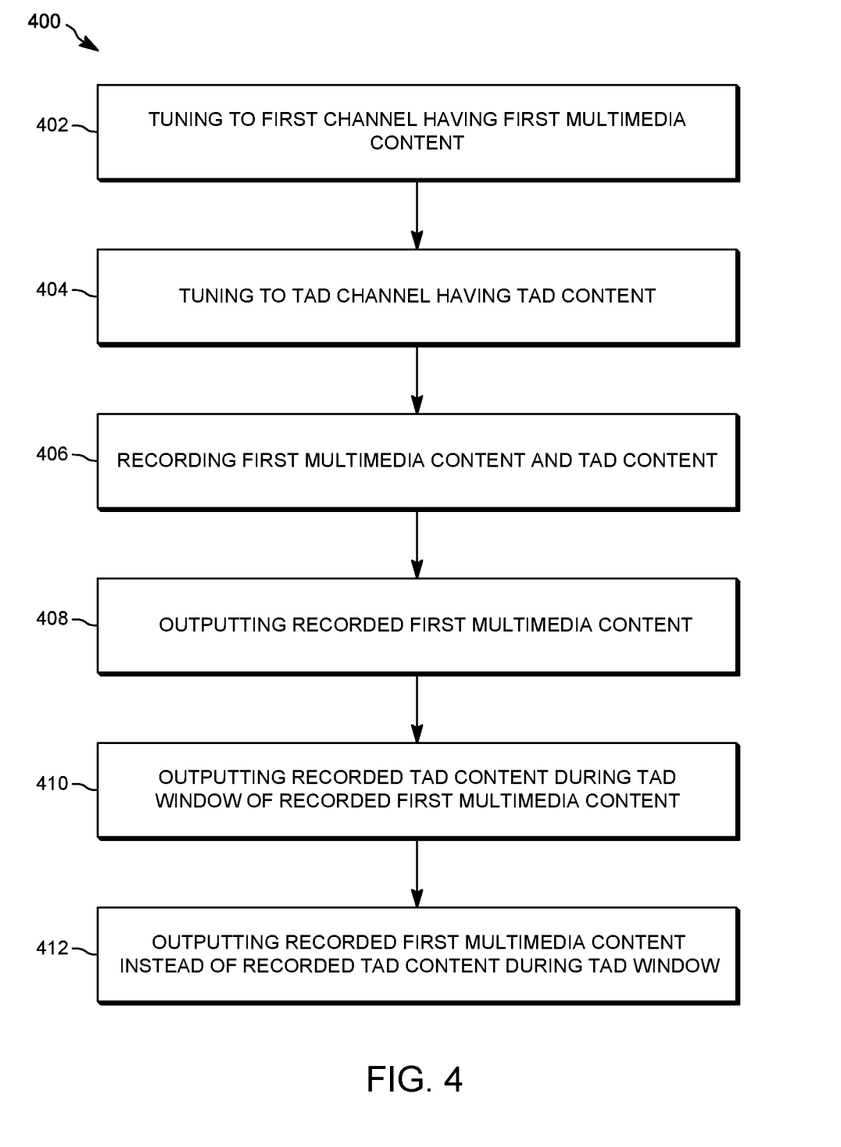
FIG. 4 is a flowchart illustrating a further example of a process of managing advertising content.

Referring to FIG. 4, a flowchart is shown of an example method or process 400 of managing advertising content, which may be performed, for example, by MSO system 112, gateway 118, set top box 120, IP set top box 124, and/or DVRs 125, 126, and/or one or more their components, such as first tuner 127, second tuner 128, first tuner 130, second tuner 132, first decoder 136, and/or second decoder 138. At 402, tuning to a first channel having first multimedia content is performed, such as via a tuner or a decoder. At 404, tuning to a TAD channel having TAD content is performed, such as via a tuner or a decoder. While tuned to the TAD channel, tuning to the first channel may be maintained. For example, tuning to a TAD channel may be performed via a second tuner or a second decoder with the tuning to the first channel maintained by a first tuner or a first decoder. Alternatively, tuning to a TAD channel may be performed via a first tuner or a first decoder with tuning to the first channel performed or maintained by a second tuner or a second decoder.

At 406, the first multimedia content of the first channel and the TAD content of the TAD channel are recorded or stored, such as via DVR 125 or 126. The recording may occur in response to receiving user input requesting that the first multimedia content of the first channel be recorded. The recording of the TAD content of the TAD channel may occur automatically without any user request received requesting recording of the TAD content of the TAD channel. At 408, the recorded first multimedia content is outputted, such as via set top box 120, DVR 125, IP set top box 124, or DVR 126. The outputting may be in response to receiving user input requesting playback of the recorded first multimedia content, such as via a graphical user interface of set top box 120, DVR 125, IP set top box 124, or DVR 126.

At 410, the recorded TAD content is outputted instead of the recorded first multimedia content during the TAD window of the recorded first multimedia content, such as via set top box 120, DVR 125, IP set top box 124, or DVR 126. At 412, the recorded first multimedia content instead of the recorded TAD content is outputted during the TAD window, such as via set top box 120, DVR 125, IP set top box 124, or DVR 126. The outputting at 412 may occur, for example, in response to receiving user input requesting the first multimedia content of the first channel during the TAD window, such as via the graphical user interface of set top box 120 or IP set top box 124. Alternatively, the outputting at 412 may occur in response to advertising logic in set top box 120, IP set top box 124, DVR 125, or DVR 126, which may occur automatically without receiving any user input requesting the first multimedia content of the first channel during the TAD window.

Additionally, method 400 may, in some embodiments, include receiving additional user input to switch between the recorded first multimedia content and the recorded TAD content. For example, user input may be received requesting the recorded TAD content instead of the recorded first multimedia content outputted at 412 during the TAD window. In response, the recorded TAD content may again be outputted in response to receiving the user input. Although FIG. 4 shows particular steps for a process of managing advertising content, other examples of the process may add, omit, replace, repeat, and/or modify one or more steps.

Figure 5:
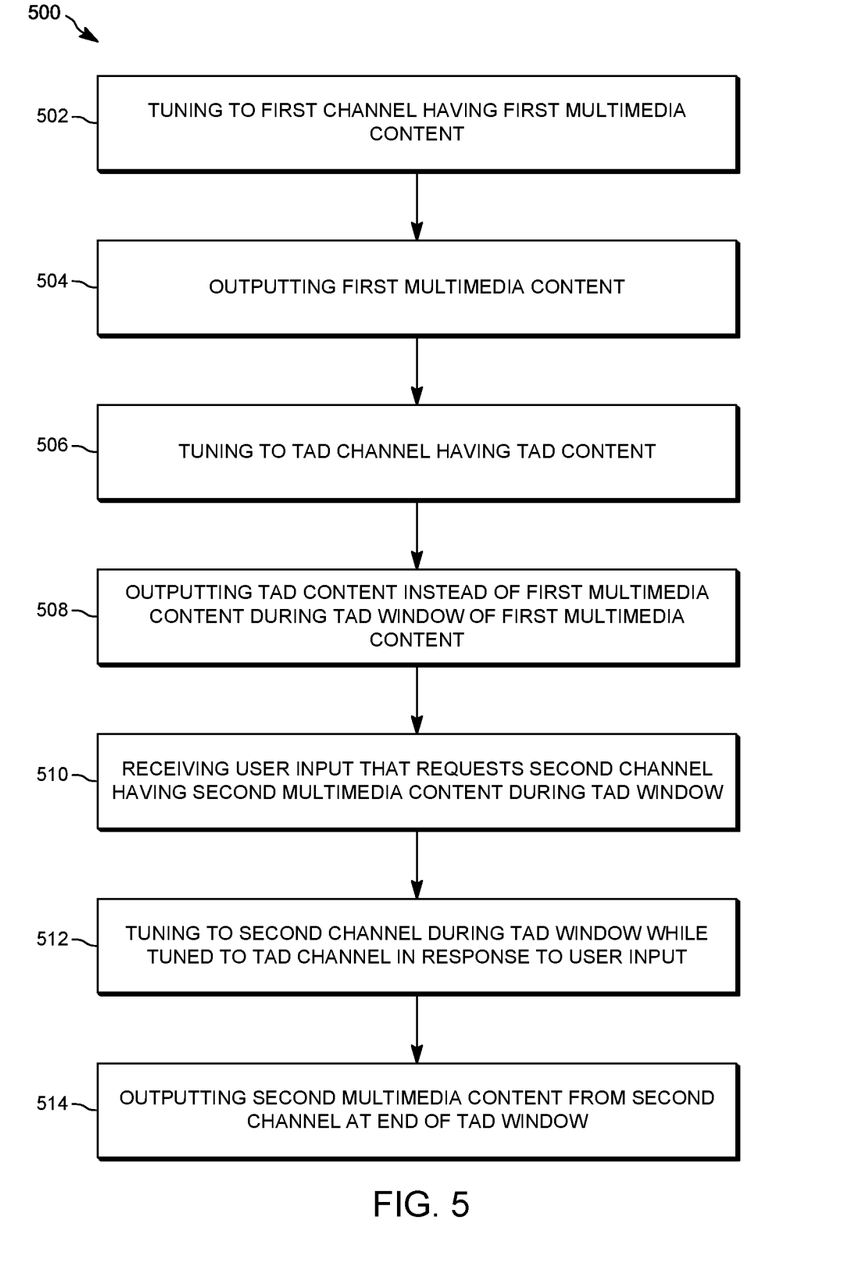
FIG. 5 is a flowchart illustrating yet another example of process of managing advertising content.

Referring to FIG. 5, a flowchart is shown of an example method or process 500 of managing advertising content, which may be performed, for example, by MSO system 112, gateway 118, set top box 120, IP set top box 124, and/or DVRs 125, 126, and/or one or more their components, such as first tuner 127, second tuner 128, first tuner 130, second tuner 132, first decoder 136, and/or second decoder 138. At 502, tuning to a first channel having first multimedia content is performed, such as via a tuner or a decoder. At 504, the first multimedia content is outputted, such as via set top box 120 or IP set top box 124. At 506, tuning to a TAD channel having TAD content is performed, such as via a tuner or a decoder. While tuned to the TAD channel, tuning to the first channel may be maintained. For example, tuning to a TAD channel may be performed via a second tuner or a second decoder with the tuning to the first channel maintained by a first tuner or a first decoder. Alternatively, tuning to a TAD channel may be performed via a first tuner or a first decoder with tuning to the first channel performed or maintained by as second tuner or a second decoder.

At 508, TAD content of the TAD channel is outputted instead of the first multimedia content of the first channel during a TAD window of the first multimedia content, such as via set top box 120 or IP set top box 124. At 510, user input that requests a second channel having second multimedia content is received during the TAD window. The second channel is a different channel from the first channel and the TAD channel. The input may be received, for example, via the graphical user interface of set top box 120 or IP set top box 124.

At 512, tuning to the second channel is performed during the TAD window in response to the received user input. While tuned to the second channel, tuning to the TAD channel may be maintained. For example, tuning to a second channel may be performed via a second tuner or a second decoder with the tuning to the TAD channel maintained by a first tuner or a first decoder. Alternatively, tuning to the second channel may be performed via a first tuner or a first decoder with tuning to the TAD channel performed or maintained by a second tuner or a second decoder. At 514, the second multimedia content of the second channel is outputted, such as via set top box 120 or IP set top box 124. The outputting at 514 may occur during the TAD window or at the end of the TAD window.

Method 500 may, in some embodiments, include storing the second multimedia content of the second channel. The content may be stored in memory, for example, on one or more live-off-disk (LOD) buffers. The storing may be in response to user input requesting the second channel and/or subsequent to tuning to the second channel. When multimedia content from the content channel(s) is stored, the outputting at step 514 may include outputting the stored multimedia content from any portion of that stored content, such as the beginning or start of the stored multimedia content, live or from a portion of the stored multimedia content that chronologically corresponds to the end of the TAD window, etc. Although FIG. 5 shows particular steps for a process of managing advertising content, other examples of the process may add, omit, replace, repeat, and/or modify one or more steps.

Figure 6:
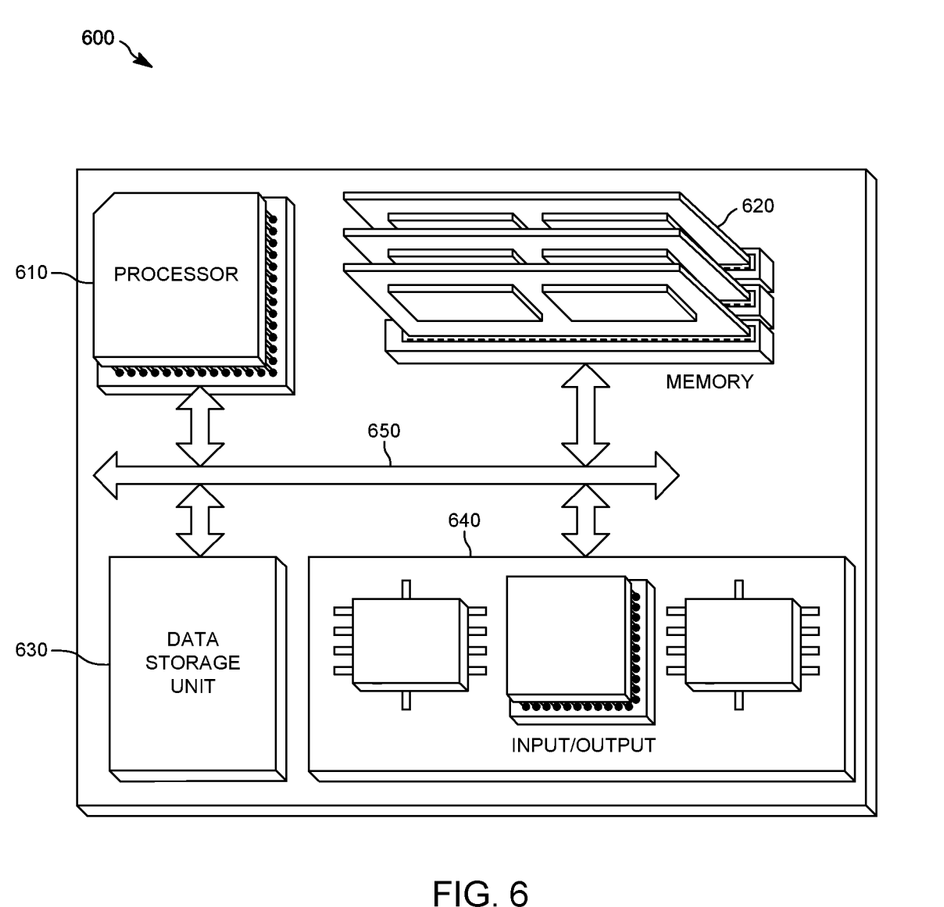
FIG. 6 is a block diagram of an example of a hardware configuration operable to manage advertising content.

Referring to FIG. 6, a hardware configuration 600 operable to facilitate automatically updating shared content is shown. The hardware configuration may be configured to implement or execute one or more of the processes performed by any of the various components, engines, modules, and devices described in the present disclosure, including MSO system 112, gateway 118, set top box 120, IP set top box 124, DVR 125, DVR 126, first tuner 127, second tuner 128, first tuner 130, second tuner 132, first decoder 136, and/or second decoder 138. The hardware configuration 600 may include a processor 610, memory 620, a storage device 630, and an input/output device 640. Each of the components 610, 620, 630, and 640 may, for example, be interconnected using a system bus 650. The processor 610 may be capable of processing instructions for execution within the hardware configuration 600. In one implementation, the processor 610 may be a single-threaded processor. In another implementation, the processor 610 may be a multi-threaded processor. The processor 610 may be capable of processing instructions stored in the memory 620 or on the storage device 630.

The memory 620 may store information within the hardware configuration 600. In one implementation, the memory 620 may be a computer-readable medium. In one implementation, the memory 620 may be a volatile memory unit. In another implementation, the memory 620 may be a non-volatile memory unit. In some implementations, the storage device 630 may be capable of providing mass storage for the hardware configuration 600. In one implementation, the storage device 630 may be a computer-readable medium. In various different implementations, the storage device 630 may, for example, include a hard disk device, an optical disk device, flash memory or some other large capacity storage device. In other implementations, the storage device 630 may be a device external to the hardware configuration 600.

The input/output device 640 provides input/output operations for the hardware configuration 600. In embodiments, the input/output device 640 may include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device, IP device, mobile device, or other device. In embodiments, the input/output device may include driver devices configured to send communications to, and receive communications from an advertisement decision system, an advertisement media source, and/or a CDN.

The methods, systems, and apparatuses described in this disclosure enable the identification and retrieval of one or more preferred or requested media renditions of multimedia content. A subscriber device may maintain a list of media attributes preferred by the subscriber device and/or one or more users with access to the subscriber device, wherein the list includes preferred media attributes in order from the most requested/received attribute to the least requested/received attribute. When the subscriber device receives a request for multimedia content, the subscriber device may identify one or more media attributes preferred by the subscriber, and media renditions of the multimedia content in each of the identified attributes may be downloaded to the subscriber device.

The subject matter of this disclosure, and components thereof, may be realized by instructions that upon execution cause one or more processing devices to carry out the processes and functions described above. Such instructions may, for example, comprise interpreted instructions, such as script instructions, e.g., JavaScript or ECMAScript instructions, or executable code, or other instructions stored in a computer readable medium.

Implementations of the subject matter and the functional operations described in this specification may be provided in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a tangible program carrier for execution by, or to control the operation of, data processing apparatus.

A computer program (also known as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows may also be performed by, and apparatus may also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory may be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the claims below. For example, the actions recited in the claims may be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of managing targeted advertising (TAD) content, comprising:
   tuning to a first channel having first multimedia content;
   outputting the first multimedia content from the first channel;
   tuning to a TAD channel having TAD content, wherein tuning to the first channel is maintained while tuned to the TAD channel;
   outputting the TAD content instead of the first multimedia content during a TAD window of the first multimedia content; and
   outputting the first multimedia content instead of the TAD content during the TAD window;
   receiving a first user input requesting the first multimedia content of the first channel during the TAD window, wherein outputting the TAD content instead of the first multimedia content during a TAD window of the first multimedia content includes outputting the TAD content instead of the first multimedia content during a TAD window of the first multimedia content in response to the first user input;
   receiving a second user input for the TAD content during the TAD window subsequent to outputting the first multimedia content instead of the TAD content during the TAD window; and
   outputting the TAD content instead of the first multimedia content during the TAD window in response to the second user input.

2. The method of claim 1, further comprising storing the first multimedia content from the first channel during the TAD window.

3. The method of claim 2, wherein outputting the first multimedia content instead of the TAD content during the TAD window includes outputting the stored first multimedia content in response to the first request.

4. A method of managing targeted advertising (TAD) content, comprising:
   tuning to a first channel having first multimedia content;
   tuning to a TAD channel having TAD content;
   recording the first multimedia content and the TAD content;
   outputting the recorded first multimedia content;
   outputting the recorded TAD content instead of the recorded first multimedia content during the TAD window of the recorded first multimedia content; and
   outputting the recorded first multimedia content instead of the recorded TAD content during the TAD window;
   receiving a first user input requesting the recorded first multimedia content during the TAD window, wherein outputting the recorded first multimedia content instead of the recorded TAD content during the TAD window includes outputting the recorded first multimedia content instead of the recorded TAD content during the TAD window in response to the first user input;
   receiving a second user input requesting the recorded TAD content during the TAD window subsequent to outputting the recorded first multimedia content instead of the recorded TAD content during the TAD window; and
   outputting the recorded TAD content instead of the recorded first multimedia content during the TAD window in response to the second user input.

\* \* \* \* \*